United States Patent [19]

DeMars

[11] Patent Number: 4,691,383
[45] Date of Patent: Sep. 1, 1987

[54] COMPACT RADIO

[76] Inventor: Robert A. DeMars, 7932 Maestro, Canoga Park, Calif. 91304

[21] Appl. No.: 862,790

[22] Filed: May 13, 1986

[51] Int. Cl.⁴ .............................................. H04B 1/08
[52] U.S. Cl. .................................... 455/351; 455/350; 381/187; 379/430
[58] Field of Search .................... 455/89, 90, 347–351; 381/183, 187; 379/430, 438, 449

[56] References Cited

U.S. PATENT DOCUMENTS

| 2,591,438 | 4/1952 | Kinman et al. | 455/351 |
| 2,630,526 | 3/1953 | Zelov | 455/350 |
| 3,426,282 | 2/1969 | Brady | 455/351 |
| 3,541,452 | 11/1970 | Disesa et al. | 455/349 |

Primary Examiner—Jin F. Ng
Attorney, Agent, or Firm—Cislo & Thomas

[57] ABSTRACT

A compact portable radio is provided, comprising a disk-like body. The radio has the usual circuitry for detecting and amplifying a radio (AM or FM) signal, an earphone assembly comprising a speaker adapted to be received by the ear of the listener and secured to a head band adapted to partially encompass the head of the listener and a wire for conveying the amplified radio signal to the speaker, and volume control. The disk-like body is provided with storage space for storing the wire and also the head band and at least a portion of the speaker. Such storage space provides a facile way of keeping the wire and earphone assembly from becoming tangled when the radio is not in use.

10 Claims, 6 Drawing Figures

COMPACT RADIO

BACKGROUND OF THE INVENTION

This invention relates generally to radios, and, more particularly, to a portable radio for easy transportability.

The use of portable radios by individuals is well-known. Joggers, people out walking, bicyclists and others make extensive use of portable radios for listening to music, news and the like while engaging in such activities.

Portable radios typically comprise a body, which houses the electronic components necessary to receive a commercially transmitted radio signal and to amplify the same. The radio further includes an earphone assembly, comprising a headband to which at least one speaker adapted to fit in the ear of the listener is secured and means for conveying the amplified signal to the speaker.

While there is such wide-spread use of portable radios, none of these radios, to the Applicant's knowledge, provide a space for storing the earphone assembly when the radio is not in use. Consequently, there is a jumble of wires and headsets which are usually tangled and require considerable time to sort out when it is desired to subsequently use the radio.

OBJECTS AND SUMMARY OF THE INVENTION

Accordingly, it is an object of the present invention to provide a compact radio of a size and shape suitable for use by the listener and provided with a means for storing most, if not all, the earphone assembly.

It is another object of the present invention to provide a compact radio that is easily transportable and conveniently used by the listener and capable of compact storage.

It is a further object of the present invention to provide a portable radio having a suitable storage means which permits easy storage and easy retrievability of the earphone assembly, thereby providing a compact unit when not in use.

These and further objects of the invention will become more readily apparent upon a consideration of the following commentary taken in conjunction with the drawings.

Briefly, a compact radio is provided. The compact radio of the invention comprises a disk-like housing defined by two major, parallel surfaces separated by a cylindrical body, with an attachment means provided on one of the major surfaces for attaching the radio to the body of a listener; electronic means within the housing for detecting and amplifying a radii signal; an earphone assembly provided with means for conveying the amplified radio signal to an ear of the listener, the earphone assembly comprising a speaker adapted to be received in the ear, an adjustable head band for partially encircling the head of the listener, with means provided on one end thereof for supporting the speaker, and a wire for conveying the amplified signal to the speaker; means in the cylindrical surface for storing the wire; means in the cylindrical surface for storing at least a portion of the earphone assembly; and means in the cylindrical surface for adjusting the volume of the amplified signal.

DETAILED DESCRIPTION OF THE INVENTION

Figure 3:
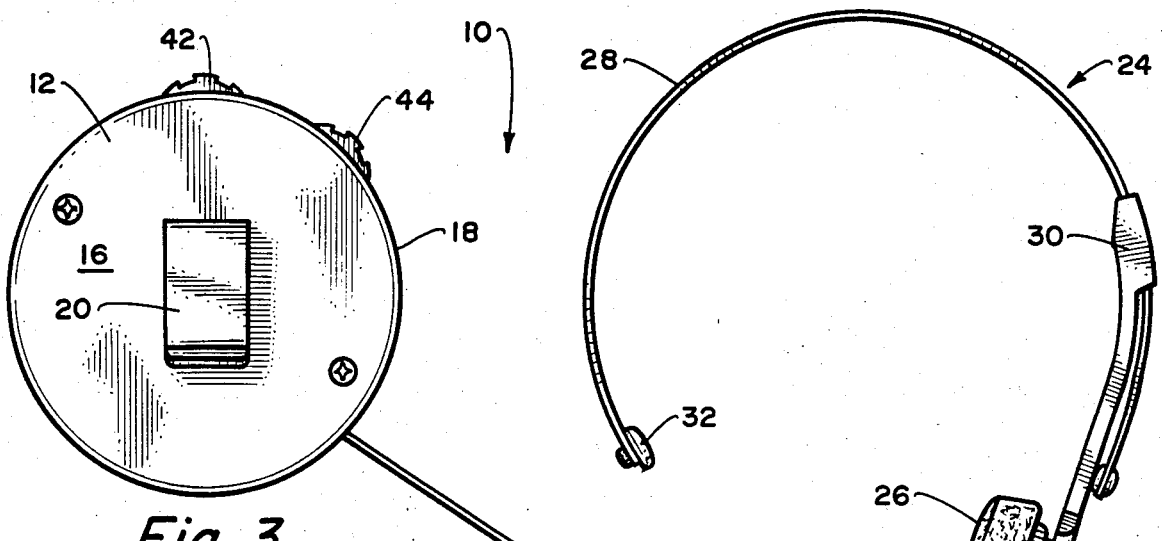
FIG. 3 is a rear elevational view of the compact radio of the invention.

Referring now to the drawings wherein like numerals of reference designate like elements throughout, a compact radio is shown generally at 10. The compact radio 10 has a disk-like housing 12 defined by two major surfaces 14, 16 separated by a cylindrical body 18. Attachment means, such as a clip 20, is provided (shown in FIG. 3) for attachment of the compact radio 10 to the person, such as to a belt or pocket of clothing of the person. Alternately or additionally, the attachment means may comprise an alligator or other "toothed" clip 21 in association with a neck "rope" (not shown) to make it convenient for women (or men) to wear around their necks in the absence of other suitable attachment locations on their clothing.

Electronic means generally depicted at 22 are provided for detecting and amplifying a radio signal. Such means are conventional and form no part of this invention.

An earphone assembly 24 provides means for conveying the amplified radio signal to the ear of the listener. The earphone assembly 24 comprises a speaker 26 adapted to be received in the ear of the listener. The speaker 26, which comprises a typical ear phone, is secured to one end of a head band 28, such as by an adhesive or by riveting or other conventional means. The head band, which is of the typical arcuate configuration for such devices for partially encircling the head of the listener, may be provided with an adjustable means 30, as is well-known for head bands used with portable radios. A rest tip 32 may also be secured to the opposite end of the head band for resting against the head of the listener. A wire 34 conveys the amplified signal from the detecting and amplifying means 22 to the speaker 26.

The cylindrical surface 18 is provided with a first storage means for storing the wire 34 when the compact radio 10 is not in use. The cylindrical surface 18 is also provided with a second storage means for storing the earphone assembly.

Figure 1:
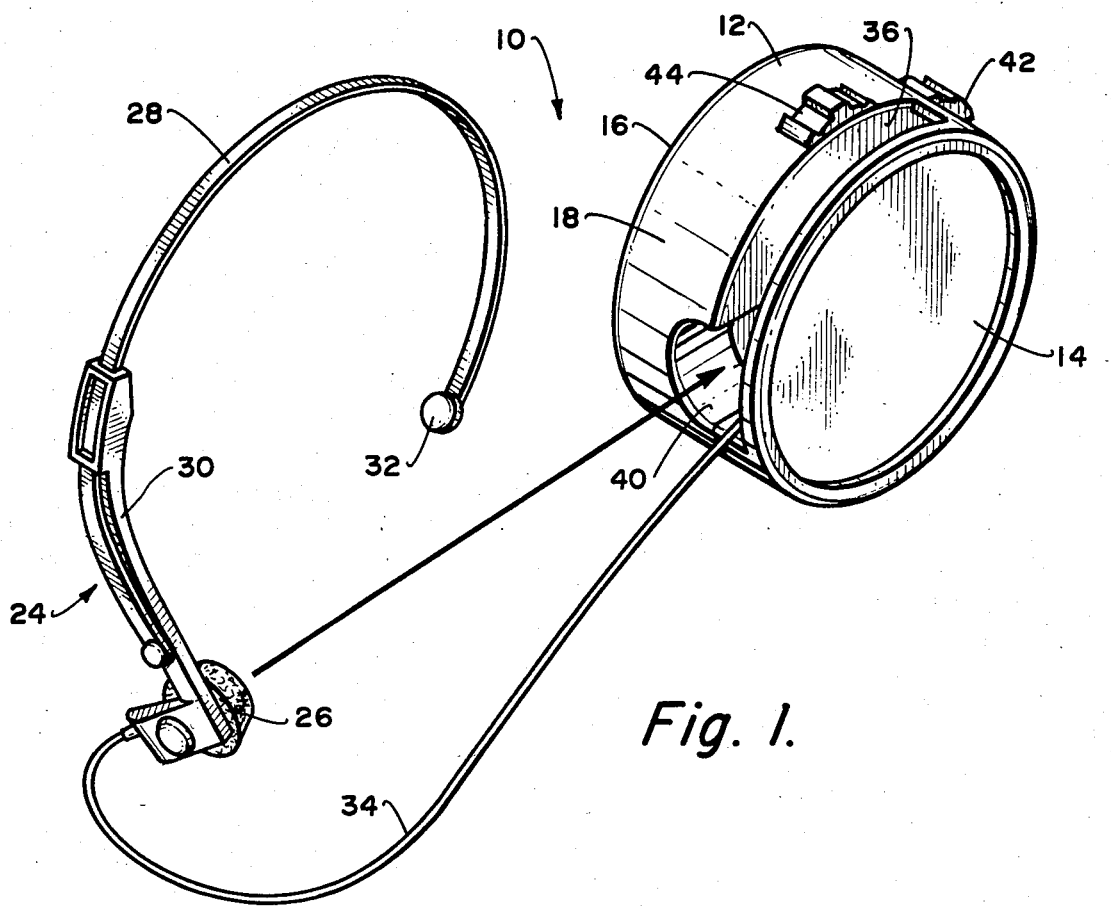
FIG. 1 is a perspective view of the compact radio of the invention, depicting how the earphone assembly may be stored.
Figure 2:
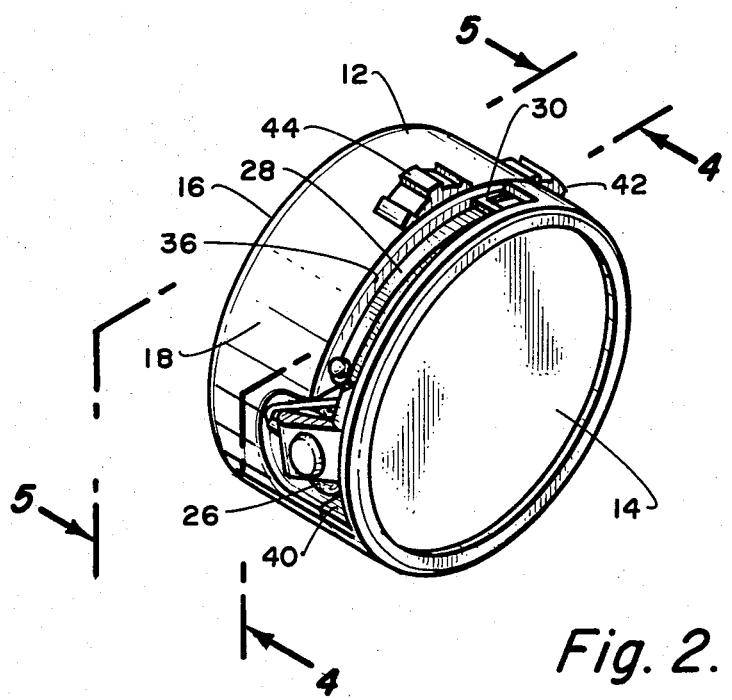
FIG. 2 is a perspective view similar to that of FIG. 1, but showing the earphone assembly in the stored configuration.
Figure 4:
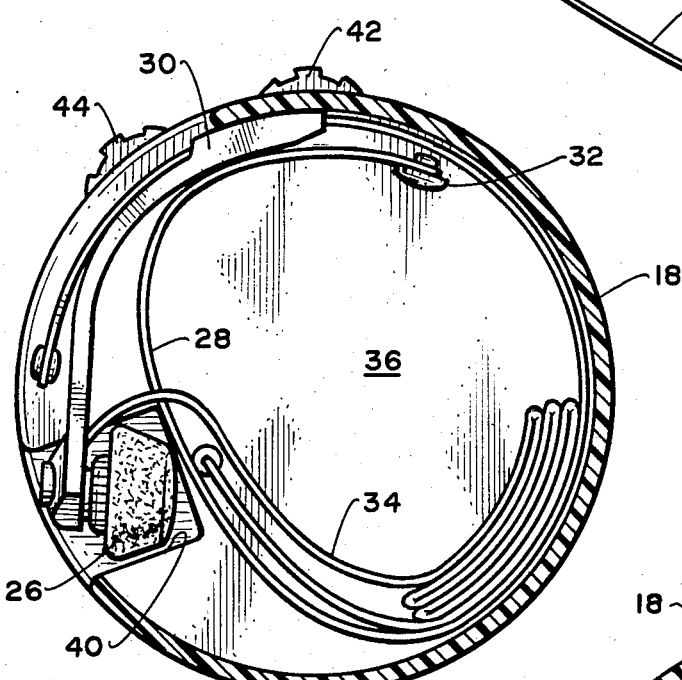
FIG. 4 is a cross-sectional view taken along the lines 4—4 of FIG. 2.
Figure 5:
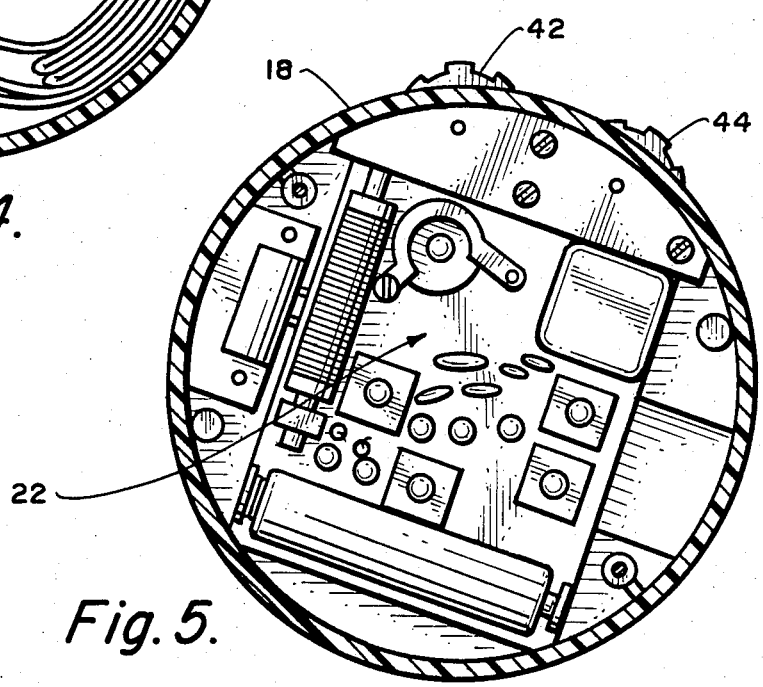
FIG. 5 is a cross-sectional view taken along the lines 5—5 of FIG. 2.

The first and second storage means may comprise one slot-like indentation 36, which may occupy a portion of the periphery of the cylindrical body 18 or a substantial portion of the interior of the body 18, as shown in FIG. 4, being of a size adapted to accommodate the wire 34 and the head band portion 28. A portion of the slot-like indentation 36 may be enlarged to form a chamber 40, to accept the speaker 26 partially or en toto, as shown in FIG. 2.

Figure 6:
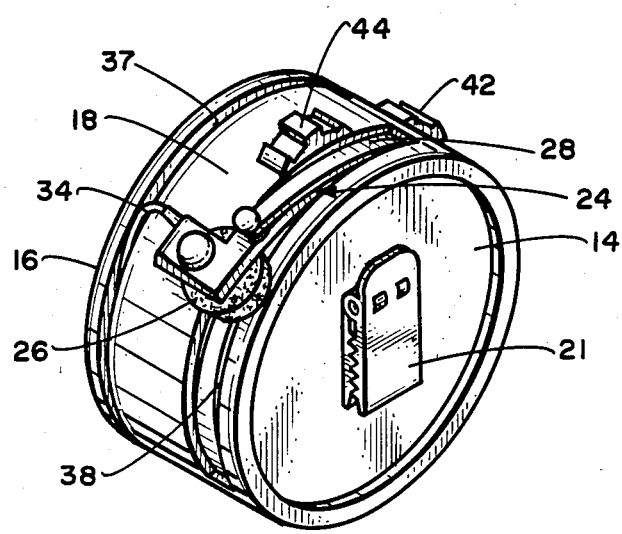
FIG. 6 is a perspective view depicting an alternate embodiment of the invention.

Alternately, the first storage means may comprise a separate annular slot 37, as shown in FIG. 6. The second storage means may comprise a slot-like indentation 38 adapted to received the head band portion 28 of the earphone assembly 24, with the speaker portion 26 urged against the surface of the cylindrical body 18.

The compact radio 10 of the invention is further provided with volume control means 42 for adjusting the volume of the amplified signal. Such volume control means are conventional and do not form a part of this invention.

Additionally, the compact radio 10 of the invention may be provided with a tuning means 44 for providing access to a plurality of radio stations. Such tuning means may, in conjunction with the detecting and amplifying circuit 22, tune to AM (amplitude modulation) or FM (frequency modulation) stations. Such tuning means is well-known and forms no part of this invention.

Alternately, the tuning means 44 may be omitted, and the detecting and amplifying circuit 22 set to receive only one frequency. Such one-station radios are often used in novelty give-aways as promotional devices to advertise a particular radio station.

Thus, a compact radio has been disclosed. Many changes and modifications will readily occur to those of skill in the art, and all such changes and modifications are within the scope of the invention, as defined by the appended claims.

What is claimed is:

1. A compact radio comprising:
   (a) a disk-like housing defined by two major, parallel surfaces separated by a cylindrical body, with an attachment means provided on at least one of said major surfaces for attaching said radio to the body of a listener;
   (b) electronic means within said housing for detecting and amplifying a radio signal;
   (c) an earphone assembly provided with means for conveying said amplified radio signal to an ear of said listener, said earphone assembly comprising a speaker adapted to be received in said ear, an adjustable head band for partially encircling the head of the listener, with means provided on one end thereof for supporting said speaker, and a wire for conveying said amplified signal to said speaker;
   (d) means cooperatively associated in said cylindrical body for storing said wire;
   (e) means cooperatively associated in said cylindrical body for storing at least a portion of said earphone assembly; and
   (f) means in said cylindrical body for adjusting the volume of said amplified signal.

2. The compact radio of claim 1 further comprising means in said cylindrical body for tuning a plurality of radio stations.

3. The compact radio of claim 1 wherein said means for storing said wire and said means for storing said earphone assembly comprise a slot-like indentation which occupies a portion of the interior of said cylindrical body, adapted to receive said wire and said head band.

4. The compact radio of claim 3 wherein said storing means further includes a chamber in said cylindrical body associated with said slot-like indentation and adapted to receive said speaker.

5. The compact radio of claim 1 wherein said means for storing said wire comprises an annular slot in said cylindrical body for wrapping said wire in an annulus and said means for storing said earphone assembly comprises a slot-like indentation in said cylindrical body, adapted to receive said head band, said speaker being urged against the surface of said cylindrical body during storage.

6. A compact radio comprising:
   (a) a disk-like housing defined by two major, parallel surfaces separated by a cylindrical body, with an attachment means provided on at least one of said major surfaces for attaching said radio to the body of a listener;
   (b) electronic means within said housing for detecting and amplifying a radio signal;
   (c) an earphone assembly provided with means for conveying said amplified radio signal to an ear of said listener, said earphone assembly comprising a speaker adapted to be received in said ear, an adjustable head band for partially encircling the head of the listener, with means provided on one end thereof for supporting said speaker, and a wire for conveying said amplified signal to said speaker;
   (d) means in said cylindrical body for storing said wire;
   (e) means in said cylindrical body for storing at least a portion of said earphone assembly, said means comprising a slot formed in said cylindrical surface of said housing, adapted to receive said head band, and a chamber formed in said cylindrical surface of said housing, adapted to receive said speaker; and
   (f) means in said cylindrical body for adjusting the volume of said amplified signal.

7. The compact radio of claim 6 further comprising means in said cylindrical body for tuning a plurality of radio stations.

8. The compact radio of claim 6 wherein said means for accepting said wire comprises an annular slot in said cylindrical body adjacent said means for accepting at least said portion of said earphone assembly.

9. A compact radio comprising:
   (a) a disk-like housing defined by two major, parallel surfaces separated by a cylindrical body, with an attachment means provided on at least one of said major surfaces for attaching said radio to the body of a listener;
   (b) electronic means within said housing for detecting and amplifying a radio signal;
   (c) an earphone assembly provided with means for conveying said amplified radio signal to an ear of said listener, said earphone assembly comprising a speaker adapted to be received in said ear, an adjustable head band for partially encircling the head of the listener, with means provided on one end thereof for supporting said speaker, and a wire for conveying said amplified signal to said speaker;
   (d) annular slot means in said cylindrical body for storing said wire in a coiled fashion;
   (e) means in said cylindrical body for storing a portion of said earphone assembly, said means comprising a slot formed in said cylindrical body of said housing, adapted to receive said head band, said speaker adapted to be urged against the surface of said cylindrical body during storage; and
   (f) means in said cylindrical surface for adjusting the volume of said amplified signal.

10. The compact radio of claim 9 further comprising means in said cylindrical surface for tuning a plurality of radio stations.

* * * * *